United States Patent [19]
Kubotera et al.
[11] 3,895,946
[45] July 22, 1975

[54] PROCESS FOR PRODUCING A LITHOGRAPHIC PRINTING PLATE

[75] Inventors: Kikuo Kubotera; Eiichi Mizuki, both of Saitama; Tadahiro Fujiwara, Kanagawa, all of Japan

[73] Assignee: Fuji Photo Film Co., Ltd., Kanagawa, Japan

[22] Filed: Oct. 18, 1972

[21] Appl. No.: 298,695

[30] Foreign Application Priority Data

Oct. 18, 1971 Japan .............................. 46-82345
Oct. 18, 1971 Japan .............................. 46-82346

[52] U.S. Cl. .................................... 96/33; 96/87 R
[51] Int. Cl. .............................................. G03f 7/02
[58] Field of Search ......................... 96/33, 87 R, 83

[56] References Cited

UNITED STATES PATENTS

| | | | |
|---|---|---|---|
| 2,494,053 | 1/1950 | Mitson et al. | 96/33 |
| 3,057,722 | 10/1962 | Alles | 96/83 |
| 3,145,105 | 8/1964 | Lee | 96/87 R |
| 3,291,610 | 12/1966 | Abbott et al. | 96/83 |
| 3,495,985 | 2/1970 | DeKeyser et al. | 96/87 R |
| 3,625,687 | 12/1971 | Dunkle | 96/33 |

OTHER PUBLICATIONS

Kenyon et al. Def. Pub. of S.N. 852,460 filed 8/22/69, pub. in 8700G1064 on 1/27/70, Def. Pub. No. T870,022.

*Primary Examiner*—David Klein
*Attorney, Agent, or Firm*—Sughrue, Rothwell, Mion, Zinn & Macpeak

[57] ABSTRACT

A process for preparing a photosensitive printing plate material such that a hydrophilic layer which is etching-bleachable correspondingly to a silver image formed in a photosensitive silver halide emulsion layer and a photosensitive silver halide emulsion layer are successive provided on a support material having a hydrophobic surface. The resulting photosensitive printing plate material is subjected to exposure through a negative copy, and then developed to form a silver image in the emulsion layer. Thereafter, the developed printing plate material is subjected to an etching-bleaching treatment to remove portions of the hydrophilic layer corresponding to the silver image, and as a result, the corresponding portions of the support material are exposed to thereby provide the printing plate material.

5 Claims, 12 Drawing Figures

PROCESS FOR PRODUCING A LITHOGRAPHIC PRINTING PLATE

In a first preferred embodiment, the silver halide emulsion layer is hardened, in which case an intermediate layer which is etching bleachable in a manner similar to the hydrophilic layer is required between the emulsion layer and the hydrophilic layer. The intermediate layer is removed with the hydrophilic layer.

In a second preferred embodiment the silver halide emulsion layer is not hardened and an intermediate layer is optional.

BACKGROUND OF THE INVENTION

1. Field of the Invention

This invention relates to a photosensitive printing plate material and to a process for producing the same, and more particularly, to a photosensitive printing plate material from which a printing plate wherein positive printed matter is obtained from a negative copy can be prepared, and to the process for producing the same.

2. Description of the Prior Art

In general, a lithographic printing plate consists of an image portion which is hydrophobic and to which printing ink adheres and a non-image hydrophilic portion.

In producing printing plates as described above, there are known processes wherein only the image portion on the hydrophilic surface of a printing plate material is caused to be hydrophobic and wherein a hydrophilic layer is provided on the surface of the hydrophobic material, whereafter only the hydrophilic layer over the image portion is removed from the surface of the hydrophobic material to thereby expose the hydrophobic surface of the printing plate material corresponding to the image portion thereof.

As a process which belongs to the latter category, there is, for example, a process for producing printing plates which as is disclosed in Japanese Patent Publication No. 27242/1969 where a hydrophilic layer containing nuclei for a diffusion transfer process is provided on a support material having a hydrophobic surface and further, a silver halide photosensitive emulsion is applied thereon to thereby obtain a photosensitive plate. Thereafter, a silver image is formed on a hydrophilic layer of the photosensitive plate in accordance with diffusion transfer development, and the photosensitive plate is subjected to an etching-bleaching treatment utilizing the thus formed silver image to remove corresponding portions of the hydrophilic layer, whereby the hydrophobic supporting material is exposed.

Furthermore, there is disclosed a process for producing printing plates in U.S. Pat. No. 3,385,701 where firstly, a sheet is prepared by providing a hydrophilic layer containing nuclei for a diffusion transfer process on a support material having a hydrophobic surface and then an exposed negative material is caused to contact the sheet to carry out diffusion transfer development and to form a silver image on the hydrophilic layer. Thereafter, the sheet is subjected to an etching-bleaching treatment utilizing the thus formed silver image to remove corresponding portions of the hydrophilic layer, whereby the hydrophobic support material is exposed.

However, all printing plates produced in accordance with the processes described above are employed only in cases in which positive prints are made from positive copies.

Recently, a tendency has been seen to employ a color negative films copying of printed matter. As a result, processes for producing printing plates where a color separation positive halftone dot pattern is prepared from a color negative copy, the thus prepared positive halftone dot pattern is printed on a suitable printing plate material, for example, a pre-sensitized plate, and the thus printed plate is subjected to a developing treatment have been generally practised.

Other processes for preparing color separation positive halftone dot pattern have been proposed based on considerations of ease of use, rapidity, and economy. However, an intermediate positive halftone dot pattern is needed in the above processes.

It would be economically advantageous and such processes would be more rapid if a printing plate could be produced directly from a color negative copy without previously preparing an intermediate positive halftone dot pattern as described above.

Such a process is disclosed in our Japanese Patent application No. 9762/1971. However, there are two disadvantages of the process described in our application:

1. in case of inking the printing plates produced, the adhesiveness of the printing ink is unfavorable and duplicates of good quality cannot be obtained in even the early stage of printing;

2. in the course of continuing the printing, the printing ink adheres to non-image portions of the printing plate and stains the plate.

The cause of these faults will be explained with reference to FIG. 6 which shows a vertical section of a printing plate where a non-image portion 63 is formed by successively superposing a hydrophilic layer 61 and a hardenable gelatin emulsion layer 62 on a hydrophobic support material 60, image portion 64 consisting of a space which is obtained by removing the hydrophilic layer 61 and gelatin emulsion layer 62 from the printing plate whereby the surface of the support material is exposed.

Accordingly, in the surface of the printing plate, the image portion 64 is concave and the non-image portion 63 is convex (because the hydrophilic layer and emulsion layer still remain) and as a result, the printing plate has a concave and convex relief surface.

When inking is directly carried out on the surface of the printing plate having a concave and convex relief surface as described above, printing ink does not stably adhere to an image portion having a large convex area and a small concave area, i.e., thin lines or small halftone dots.

One result from using such a printing plate is that the non-image portions gradually become stained with increased printing work. This phenomenon is due to the fact that the emulsion layer which functions as the hydrophilic surface at the time of printing hardens with the fat sensitivity of the hydrophilic surface increasing gradually by the action of a printing ink until finally the printing ink begins to adhere to the hydrophilic surface resulting in stains to printed material.

SUMMARY OF THE INVENTION

To eliminate the disadvantages mentioned above, the inventors reached the present invention wherein the thickness of the hydrophilic layer of the printed plate is very thin so as to enable a printing ink to be adhered in a stable manner to thin lines or a small dot pattern in the early stage of printing work. Furthermore, the printing plate is per se improved so as not to cause staining on printed materials, even with high volume printing runs.

In greater detail, the photosensitive printing plate of the present invention is prepared by providing a hardenable photosensitive silver halide emulsion layer (which is hardened if an intermediate layer is used) an intermediate layer (if a hardened photosensitive silver halide emulsion is used) and an hydrophilic layer (the hydrophilic layer, and intermediate layer if present both must be etching-bleachable corresponding to the silver image formed in the photosensitive silver halide emulsion layer) on a support material having a hydrophobic surface, and then the thus prepared photosensitive printing plate material is subjected to exposure through a negative copy so that a silver image is formed in the emulsion layer by developing. The thus treated printing plate is subjected to etching-bleaching treatment to remove the portions of the hydrophilic layer (and intermediate layer when present) corresponding to the thus formed silver image to thereby expose the support material, and further, the emulsion layer (and intermediate layer, when present) is removed to expose the hydrophilic layer.

In a first preferred embodiment, the silver halide emulsion layer is hardened, in which case an intermediate layer which is etching-bleachable in a manner similar to the hydrophilic layer is required between the emulsion layer and the hydrophilic layer. The intermediate layer is removed with the hydrophilic layer.

In a second preferred embodiment the silver halide emulsion layer is not hardened and an intermediate layer is optional.

In accordance with the foregoing, it is one object of this invention to eliminate the disadvantages of the prior art heretofore described and to provide a printing plate material the use of which enables positive prints to be obtained from a negative copy.

Another object of this invention is to provide a process for producing a printing plate material the use of which enables positive prints to be obtained from a negative copy.

Another object of this invention to provide a printing plate which is prepared by the use of a negative copy and from which excellent printed materials can be obtained.

The nature, principle, details, and utility of the invention will be more clearly apparent from the following detailed description which begins with general considerations and concludes with specific examples constituting preferred embodiments of the invention.

DETAILED DESCRIPTION OF THE INVENTION

In the following, one embodiment of the present invention will be described with reference to the accompanying drawing. The first embodiment described will be the embodiment where an intermediate layer is required, i.e., where a hardened silver halide emulsion layer is used and the intermediate layer is etching bleachable in a manner similar to the hydrophilic layer.

Unless otherwise indicated, the general description of preferred embodiments which follows relates to all embodiments of the present invention.

Figure 1:
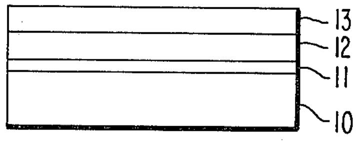
FIG. 1 is a vertical sectional view showing one embodiment of a photosensitive printing plate material according to the present invention.

FIG. 1 is a vertical sectional view showing a photosensitive printing plate material used for the present invention in which reference numeral 10 designates a support material having a hydrophobic surface, 11 a hydrophilic layer which is etching-bleachable in correspondence to a silver image formed in an emulsion layer, 12 an intermediate layer also etching-bleachable in correspondence to a silver image formed in the emulsion layer, and 13 a hardened silver halide emulsion layer.

FIG. 2 through 5, explained in detail below are vertical sectional views showing essential stages of a process for producing the printing plate of one embodiment of this invention, employing the photosensitive printing plate material shown in FIG. 1 in accordance with one embodiment of the present invention.

Figure 2:
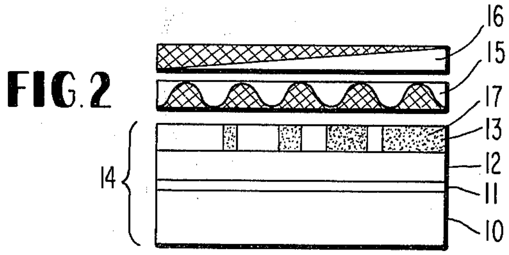
FIGS. 2 through 5, inclusive, are vertical sectional views showing essential stages of one process for producing a printing plate in accordance with this invention, where a photosensitive printing plate material shown in FIG. 1 is used.

FIG. 2 is a vertical sectional view showing the photosensitive printing plate material 14 according to the present invention is subjected to exposure from a negative copy 16 having a continuous tone through a contact screen 15. In FIG. 2 a latent image 17 is formed in the emulsion layer 13 when the continuous tone of the copy is broken into a dot pattern by the use of the contact screen.

Figure 3:
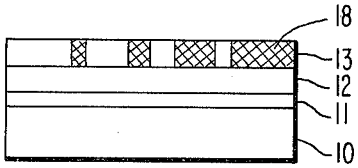

FIG. 3 is a vertical sectional view showing the printing plate material after development in which a silver image 18 is formed by developing the latent image 17 in the exposed portions of the emulsion layer 13. The image 18 has a reversal image tone with respect to that of the copy and in this case, since the copy is negative, a printing plate material having a positive image is obtained.

Figure 4:
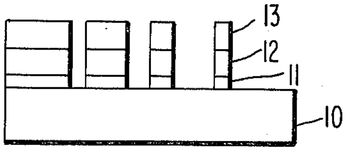

After developing the thus obtained printing plate material, it may be subjected to fixation, but generally, fixation is omitted. After washing the printing plate material with water, when it is treated with any state of the art etching-bleaching solution, the portions of the emulsion layer including the silver image are etched and the resulting material is shown in FIG. 4. In this instance, the portions corresponding to the silver image in the intermediate layer 12 and in the hydrophilic layer 11 positioned under the emulsion layer were simultaneously to the etching action.

Figure 5:
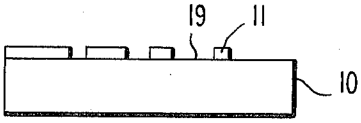
Figure 6:
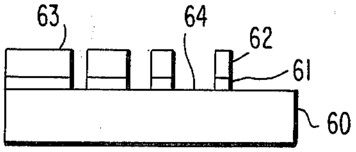
FIG. 6 is a vertical sectional view showing a conventional printing plate.

The surface of the resulting printing plate material is then rubbed with a sponge in a hot water bath having a temperature of about 30°C, whereby portions of the hydrophilic layer 11 subjected to the etching are removed together with the emulsion layer 13 and the intermediate layer 12. The resulting material is shown in FIG. 5 in which the hydrophilic layer 11 corresponding to the image portion is removed and the surface 19 of the hydrophobic supporting material 10 is exposed. The hydrophilic layer 11 corresponding to the non-image portions still remains.

The thus produced printing plate can be employed in accordance with ordinary methods.

The basic structure of the photosensitive printing plate material of the first embodiment of this invention is such that on a support material having a hydrophobic surface, a hydrophilic layer and an intermediate layer (to enable easy removal of an emulsion layer) are provided, and further, a photosensitive silver halide emulsion layer is applied thereon.

As support materials which can be employed in the present invention, there are those used generally in this technical area, for example, in addition to resin films such as polyethylene terephthalate and cellulose acetate, synthetic papers, waterproof papers, metallic sheets, and lithographic plates may be used. The only requirement for the support materials is that they have high dimensional stability, water resistance, mechanical strength, wear resistance, flexibility and resistance to various chemicals as are encountered in this art.

When a metal having a hydrophilic surface such as aluminum, chromium, stainless steel, nickel, etc. is used as the support, it is necessary to provide hydrophobic layers on the metal, whereas metals having a hydrophobic surface such as brass, copper, zinc, silver, etc. need not to be provided with a hydrophobic layers. In other words, any support materials having a greasy ink receptive property can be used in the present invention.

In the case that a hydrophilic metallic sheet such as an aluminum sheet is employed, a hydrophobic layer such as polyethylene, vinylchloride or cellulose esters, e.g., a cellulose acetate layer, is formed on the surface of the sheet through treatments such as coating, vacuum evaporation, plating, spraying, or laminations which are well known to those skilled in the art so as to render a printing ink intimately adherent to the surface.

A polyethylene terephthalate film has excellent hydrophobic properties, dimensional stability, flexibility etc., and therefore a polyethylene terephthalate film is employed in many cases as a support material.

The hydrophilic layer to be applied to the supporting material should be made of a substance which is adherant to the surface of the supporting material and, further, which can be etched in portions corresponding to a silver image formed in an emulsion layer in the course of the etching-bleaching treatment in the process for preparing the printing plate of this invention.

An example of the hydrophilic layer which meets the requirements described above can be prepared as follows:

A hydrophilic material is dissolved or dispersed in an organic solvent, the resulting solution of emulsion is applied on the support by any ordinary method, and the thus applied layer is dried. Suitable examples of such hydrophilic materials used in the present invention are gelatin or gelatin derivatives such as phthalated gelatin, gum arabic, alginic acid, cellulose nitrate, hydroxyethyl cellulose, methyl cellulose, carboxymethyl cellulose, polyacrylamide, polyvinylpyrrolidone, and copolymers thereof, polyvinyl alcohol, polyvinyl alcohol derivatives; maleic anhydride vinylacetate copolymers, maleic anhydride — ethylene copolymers, maleic anhydride — methylvinyl ether copolymers, maleic acid — styrene copolymers, and half-ester derivatives and half-amide derivatives thereof, acrylic acid copolymers, methacrylic acid copolymers; partially saponified cellulose acetate, partially saponified cellulose butyrate, partially saponified cellulose acetate butyrate, and the like. The ratio of copolymerization can range from 1:3 to 3:1. Particularly suitable hydrophilic materials are gelatin and cellulose nitrate.

The organic solvents employed in the above treatment should have the capability to dissolve or swell the surface of the support material or hydrophobic layer when a hydrophilic support, e.g., aluminum, is used. Examples of such solvents are acetone, methyl ethyl ketone, cyclohexanone, tetrahydrofuran, dioxane, methanol, ethanol, ethyl formate, ethyl acetate, benzene, toluene, methylene chloride, ethylene chloride, tetrachloroethane, trichloroethane, chloroform, chlorobenzene, ethylene chlorohydrin, chlorosulfonic acid, nitromethane, dimethylformamide, morpholine, formic acid, acetic acid, benzoic acid, salicylic acid, salicylic ester, monochloroacetic acid, dichloroacetic acid, trichloroacetic acid, trifluoroacetic acid, 2-nitropropanol, benzyl alcohol, benzaldehyde, acetonylacetone, acetophenone, benzamide, benzonitrile, benzylamine, methyl nicotinate, phenol, o-chlorophenol, cresol, and the like phenol derivatives.

These solvents may be used separately or as a mixture of two or more thereof, and a suitable solvent or solvents may be selected in accordance with the properties of the support material used.

The degree of dissolution or swelling can easily be determined by one skilled in the art since dissolution or swelling is used to increase the adherence of the hydrophilic layer to the support.

The dispersion or solution for forming the hydrophilic layer used in this invention generally comprises from 1 to 50 percent by weight of a dissolving or swelling agent (organic solvent) as described previously based on the total amount of the dispersion or solution, from 0.1 to 5 percent by weight of the hydrophilic material(s) based on the total amount of the solution or dispersion, the balance comprising a solvent or solvents for the hydrophilic material(s). Any solvent or solvents in which the hydrophilic material can be dissolved may be used so long as they are compatible with the swelling or dissolving agent (organic solvent). Usually water is used, but, for example, for nitro cellulose preferably ethanol, methylacetone, etc., are used.

Generally, more than about 50 percent by weight of the dissolving or swelling agent deteriorates the flatness of the surface of the hydrophilic layer while less than 1 percent by weight of the agent does not improve the adhesivenesss sufficiently to enable the final product to withstand rough use. The dissolving or swelling agent for the support may be used as a mixture of the agents described above, and in this case, the total amount of the agents can be in the range of from 1 to 50 percent by weight.

An effective hydrophilic layer can easily be obtained by one skilled in the art in view of the above disclosure by selecting and adjusting the composition or thickness thereof in accordance with the properties of the support material on which the hydrophilic layer is formed, the composition, degree of hardness and thickness of the emulsion layer to be provided on the hydrophilic layer, and the amount of a silver formed upon development of the printing plate material.

A thickness larger than necessary for the hydrophilic layer is disadvantageous from the viewpoint of processability and printability and accordingly, the thickness of each of the hydrophilic layer and intermediate layer can range from 0.1 to 2 $\mu$, preferably from 0.2 to 1 $\mu$.

The hydrophilic layer may contain other substances if they satisfy the aforementioned conditions, for example, agents for intensifying hydrophilic properties such as colloidal silica and, further, dyestuffs or pigments may be also added to the hydrophilic layer in order to visually ascertain the state of the printed plate surface.

Generally, unhardened or slightly hardened hydrophilic polymers are used as intermediate layers in the first preferred embodiment of this invention.

A photosensitive silver halide emulsion layer can be prepared by coating a known photographic emulsion on the supporting material.

As examples of the silver halides which can be used in this invention, those generally employed in the prior art, i.e., silver halides such as silver chloride, silver bromide, silver iodide, silver chlorobromide, silver chloriiodide, and silver chlorobromoiodide may be used. There are no restrictions on the acceptable silver halides.

As the silver halide binder used in the present invention, gelatin is generally employed, but other hydrophilic colloids such as hydrophilic high molecular weight compounds, preferably gelatin derivatives, for example, phthalated gelatin, polyvinylpyrrolidone, polyvinyl alcohol and the like, may also be employed, either singly or as a mixture thereof with or without gelatin. Any binders commonly employed in this art may also be used in this invention.

Into the silver halide emulsion, various sensitizers, sensitizing coloring materials, fog inhibitors, hardening agents, surfactants, and other additives as are usually employed in this art may be added.

The thickness of the emulsion layer usually ranges from about 1 to about 10 $\mu$, preferably from 3 to 6 $\mu$. However, greater and lesser thicknesses can be used, depending on the exact emulsion used.

In the case when a printing plate is prepared from a copy having a continuous tone by resolution into dot pattern a silver halide emulsion having a large silver halide ratio with respect to the binder is preferred as such an emulsion improves the characteristic properties of the net points and furthermore, a hard toned photograph is desirable for copying. The ratio of silver halide/binder can range from 1/3 to 6/1, preferably from 1/1 to 4/1 by weight. Emulsions for printing sensitive materials are suitable for the requirements mentioned above, the preferred emulsions being high contrast emulsions such as lithographic light-sensitive materials.

For example, a silver iodobromide emulsion containing 20 – 30 mole percent silver chloride and those having a weight ratio of 1.5 of AgX/gelatin and 1 mole of silver halide per 1 Kg of emulsion are preferred. Of course, a hard toning agent which provides high contrast such as a polyalkylene oxide is preferably added.

The emulsion layer is removed from the printing plate material after etching-bleaching, usually by peeling off the emulsion layer with hot or cold water, e.g., the emulsion layer is immersed in warm water and is rubbed by a sponge roller, or a jet stream of the warm water is applied to the emulsion layer. Of course, any equivalent art recognized procedure may be used.

In order to increase the ease of emulsion layer removal, it is necessary to provide an intermediate layer between the emulsion layer and the hydrophilic layer in the first preferred embodiment of this invention. In this case, it is necessary that the intermediate layer not impede etching of the hydrophilic layer.

As materials used in the intermediate layer, for example, hydrophilic polymers having a low degree of cross linking, i.e., having a lower degree of hardening than that of the hydrophilic layer, or a polymer which becomes hydrophilic upon contact with an alkaline developer (pH, 9 – 13), such as a vinylacetate-maleic anhydride copolymer (1:1 by weight), a polyvinyl ether-maleic anhydride copolymer (1:1 by weight), a styrene-maleic anhydride copolymer (1:1 by weight), an acrylic acid-methacrylic acid copolymers and the like, may be used.

In some cases the hardening agent added to the emulsion layer diffuses into the hydrophilic layer and causes the hydrophilic layer to harden, increasing simultaneously the cohesion between the emulsion layer and the hydrophilic layer. As a result, even when a hot water bath is used after etching-bleaching, the removal or peeling-off of the emulsion layer becomes extremely difficult.

In fact, even when a diffusion resistant additive such as a high molecular weight hardening agent is added to a hardening agent as described above often a curing reaction proceeds at the interface of the emulsion layer and the hydrophilic layer. Preferred hardening agents include aldehyde compounds such as formalin; mucochloric acid, glyoxal, glutaraldehyde and the like. The amount of hardening agent added generally can range from 0.001 to 20 percent by weight, preferably from 0.01 to 5 percent by weight, based on the weight of the binder. Suitable high molecular weight hardening agents used as diffusion resistant additives include dialdehyde starch, polyacrolein, polyvinyl maleate, methylvinyl ether-maleic anhydride copolymers, ethyleneimine derivatives, epoxy derivatives and the like. The particular hardening agent selected is not overly critical so long as it is compatible with the processing steps.

In order to eliminate such a disadvantage, it is necessary to prevent unnecessary adhesion between the hydrophilic layer and the emulsion layer by the provision of an intermediate layer. There is, however, another difficulty to be overcome in connection with the use of intermediate layers as described.

As materials which can be used to form the intermediate layer, there are hydrophilic colloidal proteins, cellulose derivatives (carboxymethyl cellulose, hydroxyethyl cellulose etc.) and metal salts thereof, alginic acid salts, starches, and vinyl derivatives (polyvinyl alcohol, polyvinyl pyrrolidone, copolymers of vinyl acetate, and maleic anhydride, copolymers of styrene and maleic anhydride, copolymers of polyvinyl ether and maleic anhydride, and copolymers of R-methacrylate and acrylic acid, where R is a lower alkyl group, preferred copolymerization ratios being 1:3 to 3:1 by weight).

In general, metal salts of alginic acid, copolymers of methacrylic acid and vinyl pyrrolidone or of methacrylic acid and methyl methacrylate, or gelatin are preferably used, either separately or as mixtures thereof.

The intermediate layer may be the same as the hydrophilic layer in certain instances. However, in this case when they are coated the hydrophilic layer contains the dissolution product of the hydrophobic surface of the support and the swelling agent, but the intermediate layer does not, containing only solvent. If necessary, the hydrophilic layer may contain a hardening agent so that at the final stage, the intermediate layer as well as the emulsion layer are easily removed. Suitable hardening agents include those recited in the preceding material.

The hardening of the intermediate layer may be carried out if desired and is the same as or weaker than that of the hydrophilic layer.

That is, in order to expose the hydrphobic layer at the time of etching the silver image portion in the upper emulsion layer, the intermediate layer and hydrophilic layer (being lower adjacent layers), must be effectively etched.

This problem has been solved by adopting an intermediate layer which can easily be etched and, as a result the intermediate layer and the hydrophilic layer are easily removed, whereby the hydrophobic surface of the supporting material can be exposed.

The characteristic properties required for such an intermediate layer are obtained by suitable adjustments in the degree of hardening of the layers, the thickness of the layers (or of the total quantity of silver after development), and the ratio of the silver to the binder present.

The photosensitive printing plate material according to the one preferred embodiment of present invention thus basically consists of a hydrophilic layer and intermediate layer (both of which can be etched) on a support material, and a photosensitive emulsion layer. However, an anti-halation layer, a protective layer or like layers may also be further provided, so long as they do not interfere with the basic requirements the essential layers must meet.

From a continuous tone original a direct screening can be obtained by using a contact screen.

In the case of preparing the printing plate, exposure may be effected either by contact printing or enlarging through the utilization of the high sensitivity of the silver halide.

In order to form the silver image in the emulsion layer, well-known developers which are prepared by mixing N-methyl-P-aminophenol, hydroquinone, 1-phenyl-3-pyrazolidone, 2,4-diaminophenol or the like with a principal developer may be employed. For instance, one would generally use developers of the following type:

| | Generally used Range | Preferred Range |
|---|---|---|
| Main Components of Developer | 0.01 – 50 | 0.5 – 20 |
| Preservative | 0 – 200 | 20 – 100 |
| Alkali Agent | 1 – 200 | 5 – 100 |
| Inhibitor | 0 – 10 | 0 – 3 |

The main components of the developer include 3-pyrazolidone developers, aminophenol developers, polyhydroxybenzene developers, etc. used singly or as a mixture thereof. The preservatives include sulfites such as sodium sulfite, sodium bisulfite etc. The alkali agents include alkali metal metaborates, alkali metal hydroxides such as sodium hydroxide, potassium hydroxide, etc., alkali metal carbonates such as sodium carbonate and the like. The inhibitors include sodium bromide, potassium bromide and the like. The treating temperature generally can range from 0° to 35°C, preferably from 15 to 30°C. Such developers are known in the art, and they or their equivalents may be used.

To improve the characteristic properties of the net points, the employment of a developer for lithographic sensitive materials for effecting dye transfer development is desirable.

A representative composition of a developer for lithographic materials is as follows:

| | |
|---|---|
| Sodium Sulfite | 30 g |
| Paraformaldehyde | 7.5 g |
| Sodium Hydrogen Sulfite | 2.2 g |
| Boric Acid | 7.5 g |
| Hydroquinone | 22.5 g |
| Potassium Bromide | 1.6 g |
| Water to make 1l | |

The above developer can be used at a temperature of from 20° to 25°C for a period of from 90 to 180 seconds.

Subsequent to the developing treatment, although a fixing treatment may be carried out, generally fixing is omitted and only washing with water is carried out, Thereafter, the thus washed printing plate materials is subjected to an etching-bleaching treatment.

As the etching-bleaching solution, standard solutions used for this purpose can be used which contain, for example, hydrogen peroxide can be employed and, in this case, an oxidizing agent for the silver image such as a cupric salt, an acid, bromide or the like is desirably added to promote the etching action.

The term "etching-bleaching treatment" used herein refers to a means for exposing the hydrophobic surface corresponding to the image portions of the support material. The treatment results in the tendency of easily peeling off the binder near the silver image, and the adjacent intermediate and hydrophilic layers. The etching-bleaching solution generally comprises an aqueous solution of an oxidizing agent such as hydrogen peroxide, persulfates, e.g., ammonium persulfate, and the like, used alone or as a mixture thereof at a concentration of from 0.25 to 30 percent by weight per 1*l* of the solution. The etching-bleaching solution may contain cupric salts and acids for promoting the etching-bleaching activity, and compounds which are capable of forming complexes of low solubility with silver.

Suitable cupric salts include water-soluble cupric salts such as cupric halides, e.g., cupric chloride, cupric bromide, cupric nitrate, cupric sulfate, cupric citrate and the like, particularly preferred cupric salts being cupric halides. The acid may be an organic acid such as citric acid, tartaric acid, phthalic acid, maleic acid and the like, or an inorganic acid such as hydrochloric acid, sulfuric acid, nitric acid and the like. Compounds which are capable of forming complexes of low solubility with silver includes halide compounds. Thus, the cupric halides as previously described for the cupric salts may also serve as compounds which form complexes with silver.

These additives can be incorporated into the etching-bleaching solution at a level of from 0.05 to 50 percent by weight, respectively.

The etching-bleaching treatment can generally be conducted at a temperature of from 5° to 40°C, preferably from 15° to 30°C for a period of from 5 seconds to 5 minutes, preferably from 15 seconds to 2 minutes.

After the etching-bleaching the portion of the hydrophilic layer subjected to the etching action is eliminated to obtain the printing plate.

The time and temperature required for the treating processes mentioned above can be easily determined by those skilled in the art.

Through the use of the printing plate produced by the process of the present invention, it has been confirmed that several thousand sheets of printed material of excellent quality can be obtained by ordinary methods in which a commercially available printing ink and wetting water are used.

As described hereinabove, in the process of the present invention a printing plate from which excellent printed copies are obtained from a color negative copy having continuous harmony can be easily produced. The process of the present invention is, of course, also applicable to line work printing.

In order to indicate still more clearly the nature and utility of the invention, the following specific examples constituting preferred embodiments of the invention are set forth, it being understood that these examples are presented as illustrative only and are not intended to limit the scope of the invention.

Example 1

A surface treatment was effected on a polyethylene terephthalate film having a thickness of 0.18 mm by irradiating the film with ultraviolet rays using a 1Kw mercury lamp at a temperature of 80°C for 1 minute in air. Then, an antihalation layer was applied on one surface of the film and a gelatin organic solvent dispersion having the following composition was applied on the other surface of the film.

| | |
|---|---|
| Gelatin | 1 g |
| Water | 1 g |
| Glacial acetic acid | 1 g |
| Methanol | 20 g |
| Acetone | 60 g |
| Methylene chloride | 10 g |
| Tetrachloroethane | 5 g |
| Phenol | 5 g |

The thus applied gelatin organic solvent dispersion was dried at a temperature of 120°C for 2 minutes to thereby provide a hydrophilic layer having a thickness of 0.3 $\mu$.

A non-hardenable sodium alginate as a 0.5 wt. percent aqueous solution was applied on the hydrophilic layer and dried to provide an intermediate layer having a thickness of 0.2 $\mu$.

Then, a panchromatically sensitized lithographic hardenable gelatin silver chlorobromide emulsion (70 percent silver chloride; containing 1 mol of silver per 1 kg of emulsion and 1.5 g of a mucochloric acid hardening agent per 1 kg of the emulsion) of high contrast was applied onto the intermediate layer to a thickness of 4 $\mu$ and dried.

Onto the resulting layer, a 1 percent aqueous gelatin solution was applied to a thickness of 1 $\mu$ (as a protective layer) and dried to provide the photosensitive printing plate material.

Then, the thus prepared printing plate material was subjected to exposure through a color negative copy having a continuous tone by the use of a net screen. A Fuji exposure lamp was employed as a light source and the exposure was carried out at a distance of 1 m from the light source employing a red filter (Latten No. 29) at a voltage of 18 volts for 2 seconds.

The thus exposed printing plate material was subjected to development, using a developer for lithographic sensitive material having the following composition, at a temperature of 20°C for 3 minutes.

| | |
|---|---|
| Boric acid | 7 g |
| Hydroquinone | 20 g |
| Potassium bromide | 2.5 g |
| Paraformaldehyde | 15 g |
| Sodium hydrogen sulfite | 2 g |
| Sodium carbonate (monohydrate) | 85 g |
| Water was added to the above components to make 1 liter of solution. | |

After washing the printing plate material thus exposed with water, it was immersed into an etching-bleaching solution prepared by admixing solution I with solution II of the following compositions in the same proportions. Etching-bleaching was at a temperature of 25°C for 1 minute.

| | | |
|---|---|---|
| Solution I: | Cupric chloride (dihydrate) | 10 g |
| | Citric acid | 10 g |
| | Water was added to the above components to make 1 liter of solution | |
| Solution II: | 3 % aqueous hydrogen peroxide solution | |
| | 1 liter | |

In the etching-bleaching treatment, the portions of the intermediate layer and the hydrophilic layer corresponding to the silver image of the emulsion layer were etched, respectively, and when the surface of the resulting printing plate was rubbed softly in a hot water at a temperature of 30°C, the etched portion of the hydrophilic layer was removed together with the emulsion layer and intermediate layer by gently shaking in warm water, whereby the surface of the polyethylene terephthalate support material was exposed. In accordance with the above-described treatment, a cyan printing plate of the copy was prepared.

The cyan printing plate thus obtained was fitted to a Davidson Type 500 offset printing machine (manufactured by Davidson Company Ltd.), and 5000 sheets of printed material produced employing a commercially available printing ink and wetting water.

Printed material of the cyan printing image of the copy having a continuous tone, high image quality, and being excellent in reproducibility was obtained.

Even after printing 5000 sheets, the surface of the printing plate was not damaged and further printing was possible.

By operations similar to those described above, four color printing was obtained by repeatedly printing a magenta image, yellow image, and black ink image, respectively.

EXAMPLE 2

3000 sheets of printed material of excellent quality were obtained by a printing plate formed by the same process as that of Example 1 except that a mixture having the following composition (including gelatin and cellulose nitrate) was applied onto the support material to provide the hydrophilic layer.

| | |
|---|---|
| Gelatin | 0.4 g |
| Cellulose nitrate | 0.4 g |
| Water | 0.4 g |
| p-Chlorophenol | 3.0 g |
| Salicylic acid | 0.12 g |
| Methanol | 1.18 g |
| Ethylene chloride | 67.0 g |
| Acetone | 30.0 g |
| Formalin (10 % aqueous solution) | 0.2 g |

EXAMPLE 3

3000 sheets of printed material of excellent quality were obtained by the use of a printing plate formed by the same process as that of Example 1, except that a mixture having the following composition (including gelatin and colloidal silica) was applied on the supporting material to a thickness of 1 $\mu$ to provide the hydrophilic layer.

| | |
|---|---|
| Water | 600 cc |
| Gelatin | 15 g |
| Dodecylbenzenesulfonate (1 % aqueous solution) | 50 cc |
| Colloidal silica (Trade name: Ludox AM) (30 % aqueous solution) | 450 cc |

EXAMPLE 4

Onto the intermediate layer prepared by the process of Example 3, a hardened silver halide emulsion (0.5 mol of silver halide per 1 kg of emulsion; an enlarging contrast emulsion consisting of 1 part of gelatin, 0.8 part of silver chlorobromide containing a 0.2 molar ratio of silver bromide based on the silver halide, 2 g of a mucochloric acid hardening agent per 1 kg of the emulsion and 8 parts of water) having the following composition was applied to a thickness of 4 $\mu$ and dried.

| | |
|---|---|
| Water | 50 g |
| Silver chlorobromide emulsion as described above | 100 g |
| Hydroquinone | 3.0 g |

The pH of the resulting mixture was adjusted to 5.5 by the use of citric acid (1 percent aqueous solution).

After exposing the photosensitive printing plate material prepared by the process mentioned above through a micro-film (enlarged), the exposed printing plate material was developed with a developer having the following composition for 15 seconds at a temperature of 25°C.

| | |
|---|---|
| Anhydrous sodium sulfite | 20 g |
| Sodium hydroxide | 30 g |
| Potassium bromide | 5 g |

Water was added to the above components to make 1 liter of solution.

Then, the printing plate material thus developed was subjected to the same treatment as described in Example 1 except for immersing the printing plate material into a 0.5 percent aqueous solution of acetic acid (a stopping bath for terminating the development) for 5 seconds. Using the thus formed printing plate, 5000 sheets of excellent quality printed material were obtained.

EXAMPLE 5

Printed material of excellent quality was obtained by the same process as in Example 1 other than that a coating solution having the following composition was applied onto the support material to provide the intermediate layer.

| | |
|---|---|
| Methyl methacrylate - Acrylic acid copolymer (1 : 1 by weight) | 0.5 g |
| Methanol | 100 g |

EXAMPLE 6

Printed material of excellent quality was obtained by the same process as in Example 1, except a coating solution having the following composition was applied on the support material to provide the intermediate layer.

| | |
|---|---|
| Gelatin | 1 g |
| Water | 100 g |

EXAMPLE 7

Printed material of excellent quality was obtained by the same process as in Example 1, except that a coating solution having the following composition was applied on the support material to provide the intermediate layer.

| | |
|---|---|
| Vinyl acetate - Maleic anhydride copolymer (1 : 1 by weight) | 1 g |
| Methanol | 100 g |

EXAMPLE 8

Printed material of excellent quality was obtained by the same process as in Example 1, except that a coating solution having the following composition was applied on the support material to provide the intermediate layer.

| | |
|---|---|
| Styrene - Maleic anhydride copolymer (1 : 1 by weight) | 1 g |
| Methanol | 100 g |

The following material will deal with the second preferred embodiment of the invention. In this embodiment the photosensitive silver halide emulsion layer is unhardened and while an intermediate layer may be used, if desired, it is not mandatory. In the first preferred embodiment of the invention, of course, the photosensitive silver halide emulsion layer is hardened and an intermediate layer is required.

It will be apparent to one skilled in the art that in this second preferred embodiment if the hydrophilic layer contains a hardening agent which would diffuse to the unhardened emulsion layer it is necessary to use an intermediate layer for the basic reasons it is used in the first preferred embodiment of the invention. Thus, to use the simplest form of the second preferred embodiment, i.e., unhardened emulsion/hydrophilic layer, no hardening agents can be present in the hydrophilic layer. If they are, one must use an intermediate layer.

Needless to say, if desired, one can always use an intermediate layer in the second preferred embodiment of this invention whether or not any hardening agents are present in any layer.

In the second preferred embodiment, the optional intermediate layer may or may not be hardened as for the case of the first preferred embodiment of the invention.

In the second embodiment of this invention, a photosensitive printing plate prepared by providing an unhardened photosensitive silver halide emulsion layer and a hydrophilic layer (which is etching-bleachable in correspondence to a silver image formed in the photosensitive silver halide emulsion layer) on a support material having a hydrophobic surface, subjecting the thus prepared photosensitive printing plate material to exposure through a negative copy, forming a silver image in the emulsion layer by developing, subjecting to the thus treated printing plate etching-bleaching to remove the portions of the hydrophilic layer corresponding to the thus formed silver image to thereby selectively expose the surface of the support material, and finally removing the remaining emulsion layer to expose the hydrophilic layer. The material, processing techniques etc., of the second preferred embodiment are otherwise identical to those of the first preferred embodiment of the invention, subject to the heretofore stated restrictions regarding the hardening agents.

The second preferred embodiment of the invention will now be explained with reference to FIGS. 7 to 12 of the drawings.

Figure 7:
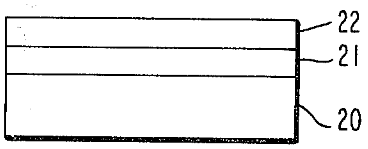
FIG. 7 is a vertical sectional view showing one embodiment of the starting photosensitive printing plate material according to the present invention.

FIG. 7 is a vertical sectional view showing a photosensitive printing plate used in the present invention in which reference numeral 20 designates a support material wherein at least the surface is hydrophobic, 21 a hydrophilic layer which is etching-bleachable corresponding to a silver image formed in an emulsion layer, and 22 an unhardened silver halide emulsion layer.

FIGS. 8 through 11, inclusive, are vertical sectional views showing essential stages of a process for producing a printing plate in accordance with a second embodiment of this invention employing the photosensitive printing plate material shown in FIG. 7 (the numerals used in FIGS. 8 – 11 correspond to the identification scheme in FIG. 7).

Figure 8:
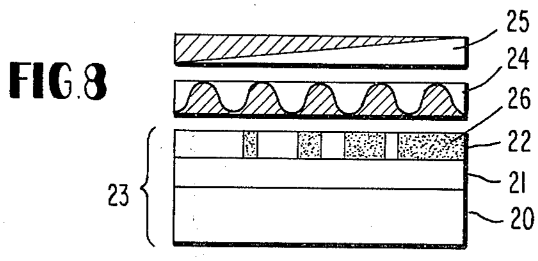
FIGS. 8 through 11, inclusive, are vertical sectional views showing essential stages of a process for producing the printing plate of this invention, using the photosensitive printing plate material shown in FIG. 7 in accordance with one embodiment of the present invention.

FIG. 8 is a vertical sectional view showing the photosensitive printing plate material 23 according to the present invention subjected to exposure from a negative copy 25 having continuous tone through a contact screen 24. In FIG. 8 a latent image 26 in the emulsion layer 22 of a dot pattern is obtained from the continuous tone of the copy by the use of the contact screen 24.

Figure 9:
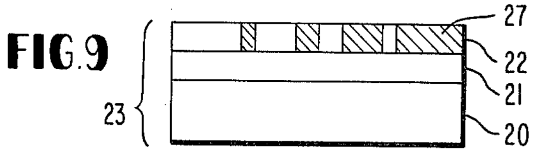

FIG. 9 is a vertical sectional view showing the printing plate material 23 in which a silver image 27 has been formed by developing the latent image 26 in the exposed portions of the emulsion layer 22. The image 27 has a reversal image tone with respect to that of the original copy and in this case since the copy is a negative, a printing plate material having a positive image is obtained. After developing the thus obtained printing plate material, it may be subjected to fixation, but generally, fixation is omitted.

Figure 10:
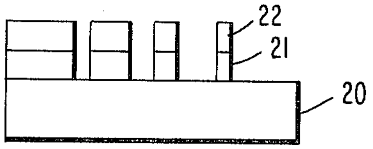

The printing plate material is then subjected to etching-bleaching using any well-known etching-bleaching solution, whereby the portion of the emulsion layer including the silver image is etched to provide the structure shown in FIG. 10. In this case, the portions of the hydrophilic layer 21 under the portions of the emulsion layer corresponding to the silver image 27 are simultaneously subjected to the etching action, and removed, thereby selectively exposing the surface of support 20.

Figure 11:
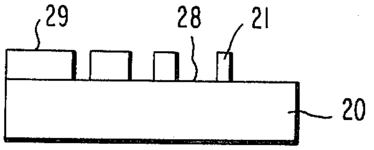

The surface of the resulting printing plate material is usually rubbed with a sponge in a hot water bath having a temperature of about 30°C to remove the portions of the hydrophilic layer 21 subjected to the etching action together with the emulsion layer 22, and the structure of FIG. 11 results after such rubbing whereby the hydrophilic layer 21 corresponding to the image portion is removed and a surface 28 of the hydrophobic supporting material 20 is exposed, and on the other hand, the hydrophilic layer 21 corresponding to a non-image portion 29 still remains.

The thus produced printing plate can be employed in accordance with any ordinary printing method.

The basic structure of the photosensitive printing plate material used for this invention is such that on a support material having a hydrophobic surface a hydrophilic layer is provided, and further an unhardened photosensitive silver halide emulsion layer is applied thereon.

Figure 12:
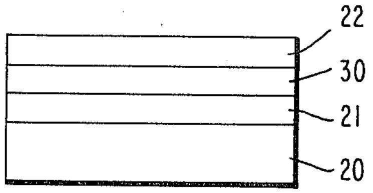
FIG. 12 is a vertical sectional view showing another embodiment of the starting photosensitive printing plate material according to the present invention.

Another basic structure of the photosensitive printing plate material employed in the present invention is as shown in FIG. 12 as comprising a support material 20 having a hydrophobic surface, a hydrophilic layer 21, an intermediate layer 30, and an unhardened silver halide emulsion layer 22, in the recited order.

EXAMPLE 9

The materials and processing sequence of Example 1 were exactly duplicated except for the following changes:

a. the sodium alginate intermediate layer was omitted;

b. the gelatin silver chlorobromide emulsion layer was unhardened;

c. since no sodium alginate intermediate layer was present, following etching an intermediate layer was not removed.

Upon printing as in Example 1 using the plate of Example 9 (no intermediate layer; unhardened AgClBr layer), results as were achieved in Example 1 were also achieved.

EXAMPLE 10

Example 9 was duplicated except for using the hydrophilic layer of Example 2 instead of the hydrophilic layer of Example 9. Results as in Example 2 were achieved.

EXAMPLE 11

Example 9 was duplicated except for using the hydrophilic layer of Example 3 instead of the hydrophilic layer of Example 9. Results as in Example 3 were achieved.

EXAMPLE 12

The materials and processing sequence of Example 4 were exactly duplicated except for the following changes:

a. the intermediate layer was omitted b. the gelatin silver chlorobromide layer was unhardened c. no intermediate layer removal was performed.

Upon printing as in Example 4, the plate of this invention gave results as were achieved in Example 4.

EXAMPLE 13

3000 sheets of excellent quality printed material were obtained by the same process as in Example 2 except that a coating solution having the following composition was provided between the hydrophilic layer and the silver halide emulsion layer to provide an intermediate layer having a thickness of 1 μ:

| | |
|---|---|
| Methyl methacrylate-Acrylic acid (1 : 1 wt) copolymer | 0.5 g |
| Methanol | 100 g |

EXAMPLE 14

3000 sheets of excellent quality printed material were obtained by the same process as in Example 11 except that a coating solution having the following composition was provided between the hydrophilic layer and the silver halide emulsion layer to provide an intermediate layer having a thickness of 1 μ:

| | |
|---|---|
| Viinyl acetate-Maleic anhydride (1 : 1 wt) copolymer | 1 g |
| Methanol | 100 g |

EXAMPLE 15

3000 sheets of excellent quality printed material were obtained by the same process as in Example 10 except that a coating solution having the following composition was provided between the hydrophilic layer and the silver halide emulsion layer to provide an intermediate layer having a thickness of 1 μ:

| | |
|---|---|
| Styrene-Maleic anhydride (1 : 1 wt) copolymer | 1 g |
| Methanol | 100 g |

EXAMPLE 16

3000 sheets of excellent quality printed material were obtained by the same process as in Example 10 except that a coating solution having the following composition was provided between the hydrophilic layer and the silver halide emulsion layer to provide an intermediate layer having a thickness of 1 μ:

| | |
|---|---|
| Gelatin | 1 g |
| Water | 100 g |

EXAMPLE 17

3000 sheets of excellent quality printed material were obtained by the same process as in Example 2 except that a coating solution having the following composition was provided between the hydrophilic layer and the silver halide emulsion layer to provide an intermediate layer having a thickness of 1 μ:

| | |
|---|---|
| Gelatin | 1 g |
| Sodium alginate | 1 g |
| Chromium sulfate | 0.1 g |
| Water | 400 g |

While the invention has been described in detail and with reference to specific embodiments thereof, it will be apparent to one skilled in the art that various changes and modifications can be made therein without departing from the spirit and scope thereof.

What is claimed is:

1. A process for producing a printing plate material which comprises the steps of successively forming a hydrophilic layer, an intermediate layer, and a hardened photosensitive silver halide emulsion layer, said intermediate layer between said hydrophilic layer and said emulsion layer being etching-bleachable corresponding to a silver image formed in said emulsion layer and said intermediate layer enabling easy removal of said emulsion layer, on a support having a hydrophobic surface to obtain a photosensitive printing plate material, the hydrophilic layer being etching-bleachable corresponding to a silver image formed in the emulsion layer, exposing the emulsion layer through a negative copy, developing to form a silver image in said emulsion layer, removing portions of said hydrophilic layer corresponding to said silver image in the emulsion layer by an etching-bleaching treatment to thereby expose the corresponding portions of said support material, and removing the entire emulsion layer and intermediate layer in the non-image areas to thereby expose the hydrophilic layer.

2. A process as claimed in claim 1 in which the thickness of said hydrophilic layer is from about 0.1 to about 2 μ.

3. The process of claim 1 wherein the hydrophilic layer is prepared by dissolving or dispersing a hydrophilic material and a dissolving or swelling agent for the support in an organic solvent, and applying the resulting composition to the support.

4. The process as claimed in claim 3 in which said hydrophilic layer is prepared by dissolving or dispersing a hydrophilic material into at least one organic solvent selected from the group consisting of acetone, methyl ethyl ketone, cyclohexanone, tetrahydrofuran dioxane, methanol, ethanol, ethyl formate, ethyl acetate, benzene, toluene, methylene chloride, ethylene chloride, tetrachloroethane, trichloroethane, chloroform, chlorobenzene, ethylene chlorohydrin, chlorosulfonic acid, nitromethane, dimethylformamide, morpholine, formic acid, acetic acid, benzoic acid, salicylic acid, salicylic ester, monochloroacetic acid, dichloroacetic acid, trichloroacetic acid, trifluoroacetic acid, 2-nitropropanol, benzyl alcohol, benzaldehyde, acetonylacetone, acetophenone, benzamide, benzonitrile, benzylamine, methyl nicotinate, phenol, o-chlorophenol and cresol.

5. The process of claim 1, in which said intermediate layer comprises at least one member selected from the group consisting of an alginic acid salt, methyl methacrylateacrylic acid copolymer, gelatin, vinyl acetate-maleic anhydride copolymer, and styrene-maleic anhydride copolymer.

* * * * *